United States Patent [19]
Mauz

[11] 3,960,928
[45] *June 1, 1976

[54] PROCESS FOR THE MANUFACTURE OF CONDENSATION PRODUCTS FROM PHENOLS AND POLYACETOACETIC ACID ESTERS

[75] Inventor: Otto Mauz, Niederhofheim, Taunus, Germany

[73] Assignee: Hoechst Aktiengesellschaft, Frankfurt am Main, Germany

[ * ] Notice: The portion of the term of this patent subsequent to June 1, 1993, has been disclaimed.

[22] Filed: Mar. 7, 1975

[21] Appl. No.: 556,219

Related U.S. Application Data

[63] Continuation of Ser. No. 402,753, Oct. 2, 1973, abandoned, which is a continuation-in-part of Ser. No. 82,810, Oct. 21, 1970, abandoned.

[30] Foreign Application Priority Data

Oct. 23, 1969 Germany............................ 1953333

[52] U.S. Cl. ............................................ 260/473 S
[51] Int. Cl.² ......................................... C07C 69/76
[58] Field of Search ................................. 260/473 S

[56] References Cited
UNITED STATES PATENTS

| | | | |
|---|---|---|---|
| 3,450,746 | 6/1969 | Stapfer | 260/473 S |
| 3,577,384 | 5/1971 | Mauz et al. | 260/473 S |
| 3,639,447 | 2/1972 | Taylor et al. | 260/473 S |

Primary Examiner—Paul J. Killos
Attorney, Agent, or Firm—Curtis, Morris & Safford

[57] ABSTRACT

Polyphenol-carboxylic acid esters are prepared from definite phenols and polyacetoacetic acid esters by condensing the components in the presence of hydrogen chloride at a temperature of from −10° to +15°C, using ethyl mercaptan as catalyst; the obtained esters are useful as fungicides or bactericides as well as for stabilizing plastic resins and manufacture of varnishing resins.

1 Claim, No Drawings

PROCESS FOR THE MANUFACTURE OF CONDENSATION PRODUCTS FROM PHENOLS AND POLYACETOACETIC ACID ESTERS

The present application is a continuation of application Ser. No. 402,753, now abandoned which in turn is a continuation-in-part of application Ser. No. 82,810 filed Oct. 21, 1970, and now abandoned.

The present invention relates to a process for the manufacture of condensation products from phenols and polyacetoacetic acid esters.

It has been proposed in German Pat. No. 1,093,377 laid open to public inspection to carry out the condensation of phenol with levulinic acid at 40° to 80°C in hydrochloric acid of 37 to 40 % strength as catalyst.

It has been found, however, that this mode of operation cannot be used for the condensation of phenols with polyacetoacetic acid esters because the polyacetoacetic acid ester is saponified by the aqueous hydrochloric acid at a temperature above 20°C. The acetoacetic acid formed is not stable and decomposes at once into acetone and carbon dioxide. The acetone undergoes condensation with the phenols in the presence of hydrogen chloride, whereby bis (4-hydroxyphenyl)-dimethylmethane or derivatives thereof are formed.

From U.S. Pat. No. 3,427,345 it is known to use mercaptoacetic acid to speed up the reaction of a phenol with a levulinic ester. However, when mercaptoacetic acid is employed in a reaction of a phenol with polyacetoacetic acid esters only very poor yields are obtained. (see Comparative Example 1 c).

From German Auslegeschrift No. 1,213,852 it is known to prepare 4,4-bis-(4-hydroxyphenyl)-pentanoic acids from a phenol and levulinic acid in the presence of hydrochloric acid and a mercapto compound. The preferred mercapto compound is methyl mercaptan. If ethyl mercaptan is used as catalyst the yields are much lower than with methylmercaptan (see Comparative Example 2 of German Offenlegungsschrift No. 1,213,852.)

Surprisingly, quite the opposite is true when polyacetoacetic acid esters are used instead of levulinic acids. In this case ethyl mercaptan promotes the reaction much stronger and higher yields are obtained than with methyl mercaptan (see Comparative Example 1 d).

It has now been found that the saponification of the polyacetoacetic acid ester can be inhibited by carrying out the condensation at low temperatures. Owing to the fact that the condensation takes place very slowly at low temperature ethyl mercaptan is added as catalyst so that the equilibrium is obtained more rapidly.

The present invention provides a process for the manufacture of condensation products from phenols of general formula I

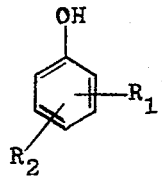

and polyacetoacetic acid esters of general formula II

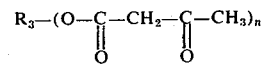

in which formula $R_1$ and $R_2$ each represent hydrogen atoms, identical or different alkyl radicals having 1 to 4 carbon atoms, $R_3$ stands for a saturated, straight chain or branched aliphatic, aromatic, araliphatic or cycloaliphatic hydrocarbon radical having 2 to 12 carbon atoms and $n$ means 2 to 4, which comprises carrying out the condensation in the presence of gaseous hydrogen chloride at a temperature in the range of from −10° to +15°C, preferably about 10°C, and in the presence of ethyl mercaptan, in an amount of from 0.05 to 0.5 % by weight, calculated on the polyacetoacetic acid ester used.

Suitable phenols which can be used in the condensation are, for example, phenol, o-cresol, 2-isopropylphenol, 2-sec.-butyl-phenol, 2-tert.butylphenol, 2-methyl-4-sec.butylphenol, 2-methyl-4-tert.butylphenol, 2,6-dimethylphenol and 2,6-diisopropylphenol.

The polyacetoacetic acid esters are prepared by adding diketene to the respective polyol, using as catalyst basic compounds, for example triethyl amine. Polyols having a high melting point are dissolved in a solvent that is inert towards diketene whereupon the addition reaction with diketene is carried through.

To produce the polyacetoacetic acid esters the following polyols may be used: ethylene glycol, propanediol, 1,4-butanediol, 1,6-hexanediol, 1,10-decanediol, 1,12 dodecanediol, 2,2-dimethyl-1,3-propanediol, trimethylol-propane, glycerol, pentaerythritol, cyclohexanediol, 1,4-dimethylol-cyclohexane, 1,1,4,4-tetra-methylol-cyclohexane. To produce aromatic polyacetoacetic acid esters hydroquinone, resorcinol and dihydroxynaphthalenes may be used.

To carry out the process of the invention 3 to 4 moles of phenol of general formula I are used for each acetoacetyl group and the condensation is effected at a temperature of from −10° to +15°C, preferably about 10°C, in the presence of dry gaseous hydrogen chloride and 0.05 % to 0.5 % by weight of ethyl mercaptan, calculated on the polyacetoacetic acid ester used. The condensation may also be carried out under a hydrogen chloride excess pressure of 1 to 3 atmospheres, a method which is especially suitable when operating on an industrial scale. An exact maintenance of the temperature is essential. At 20°C the polyacetoacetic acid ester is partially saponified so that considerably lower yields are obtained at condensation temperatures of 20°C and there above. Owing to the low condensation temperature it may sometimes be necessary to use a solvent, for example methylene chloride, toluene or anisole.

The condensation being terminated, the dissolved hydrogen chloride, water and mercaptan are removed by means of a water jet vacuum pump at a temperature of from 10° to 20°C. The phenol in excess is then eliminated by vacuum distillation at 100° to 180°C. The mostly resinous residue is recrystallized from an organic solvent or precipitated as crystalline substance by adding a nonsolvent to the solution.

The polyphenol-carboxylic acid esters obtained by the process of the invention can be used for many purposes, for example for stabilizing plastics materials, as fungicides or bactericides or for the manufacture of varnishing resins.

In the following table there are indicated the refractive indices at 20°C or the melting points of the polyacetoacetic acid esters used in Example 1 to 9.

| | |
|---|---|
| ethylene glycol-1,2-bis (acetoacetic acid ester) | $n_D^{20}$ 1.4535 |
| 1,4-butanediol bis (acetoacetic acid ester) | $n_D^{20}$ 1.4562 |
| 1,6-hexanediol-bis (acetoacetic acid ester) | $n_D^{20}$ 1.4544 |
| 2,2-dimethyl-1,3-propanediol-bis (acetoacetic acid ester) | $n_D^{20}$ 1.4525 |
| pentaerylthritol-tetra-(acetoacetic acid ester) | $n_D^{20}$ 1.4776 |
| tetramethylol-cyclohexane-1,1,4,4-tetra(acetoacetic acid ester) | melting point 72°C |
| dimethylol-cyclohexane-1,4-bis(acetoacetic acid ester) | melting point 66°C |
| cyclohexane-1,4-bis (acetoacetic acid ester) | melting point 56°C |

The following examples serve to illustrate the invention.

EXAMPLE 1

Bis[3,3-bis(4'-hydroxy-3'-tert.butylphenyl)-butanoic acid]-glycol ester

A reaction flask was charged with 1,200 grams of o-tert.butylphenol (8 moles) and 230 grams of ethylene glycol-1,2-bis-(acetoacetic acid ester) (1 mole), the reaction mixture was cooled to 10°C, 1.14 grams of ethyl mercaptan were added and dry gaseous hydrogen chloride was introduced until the mixture was saturated. By cooling with icewater the condensation temperature was maintained for 24 hours at 10°C. The aqueous hydrochloric acid was removed by a water jet vacuum pump at 15°–20°C. The temperature was then slowly raised to 180°C to distill off the excess of o-tert-.butylphenol. The resinous crude product obtained after cooling was recrystallized from toluene.

Yield 595 grams 75 %, calculated on the acetoacetic acid ester). Melting point: 134°C. Analysis: $C_{50}H_{66}O_8$. Found: 75.5 %, C; 8.3 %, H. Calculated: 75.9 %, C; 8.3 %, H.

COMPARATIVE EXAMPLE 1 a

Condensation at 40°C

600 Grams of o-tert.butylphenol (4 moles), 115 grams of ethylene glycol-1,2-bis-(acetoacetic acid ester) (0.5 mole) and 0.57 grams of ethyl mercaptan were mixed as described in Example 1 and condensed for 24 hours at 40°C. During condensation a weak current of hydrogen chloride was passed through the mixture at intervals. The reaction mixture was worked up in the manner described in Example 1.

Yield: 71 grams (18 % calculated on the acetoacetic ester used) melting point 116°C.

COMPARATIVE EXAMPLE 1 b

Condensation without addition of ethyl mercaptan

600 Grams of o-tert.butylphenol and 115 grams of ethylene glycol-1,2-bis-(acetoacetic acid ester) were mixed and saturated with gaseous hydrogen chloride. Condensation was continued for 72 hours at 10°C. The reaction mixture was worked up in the manner described in Example 1.

Yield: 65 grams (16 %, calculated on the acetoacetic acid ester used) melting 130°C.

COMPARATIVE EXAMPLE 1 c

Condensation with mercapto-acetic acid as catalyst according to U.S. Pat. No. 3,427,345)

Example 1 was repeated with the only difference that ethyl mercaptan was replaced by 0.9 grams of mercapto-acetic acid. The higher amount of mercapto-acetic acid is necessary to provide the same number of SH-groups in the reaction mixture.

Yield: 90 grams (22 % calculated on the acetoacetic acid ester). Melting point: 132°C.

COMPARATIVE EXAMPLE 1 d

Condensation in the presence of methyl mercaptan instead of ethyl mercaptan

Example 1 was repeated with the only difference that ethyl mercaptan was replaced by 1,14 g methyl mercaptan.

Yield: 380 g (=48 % calculated on the acetoacetic acid ester) Melting point: 134°C.

EXAMPLE 2

Bis[3,3-bis (4'-hydroxy-3'-tert.butylphenyl)-butanoic acid]1,4-butanediol ester

In the manner described in Example 1, 450 grams of o-tert.butylphenol (3 moles), 129 grams of 1,4-butanediol-bis(acetoacetic acid ester) (0.5 mole) and 0.64 gram of ethyl mercaptan were condensed for 24 hours at 10°C in the presence of hydrogen chloride. 390 Grams of a resinous product were obtained. After recrystallization 288 grams (70 %, calculated on the acetoacetic ester) of a white crystalline compound melting at 120°C were obtained.

Analysis: $C_{52}H_{70}O_8$. Calculated: 76.0 %, C; 8.5 %, H. Found: 75.4 %, C; 8.3 %, H.

EXAMPLE 3

Bis[3,3-bis(4'-hydroxy-3-tert.butylphenyl)-butanoic acid]-1,6-hexanediol ester

A mixture of 450 grams of o-tert.butylphenol (3 moles), 143 grams of 1,6-hexanediol-bis(acetoacetic acid ester) (0.5 mole) and 0.6 gram of ethyl mercaptan was condensed as described in Example 1 for 18 hours at 10°C with hydrogen chloride. After removal of the water and o-tert.butylphenol in excess, 390 grams of a brown and brittle resin were obtained. After recrystallization from acetone, 272 grams (64 %, calculated on the acetoacetic acid ester) of a crystalline product having a melting point of 104°C were obtained.

Analysis: $C_{54}H_{74}O_8$. Calculated: 76.0 %, C; 8.7 %, H. Found: 75.2 %, C; 8.1 %, H.

EXAMPLE 4

Bis[3,3-bis (4'-hydroxy-3-tert.butylphenyl)-butanoic acid]-2,2-dimethyl-1,3-propanediol ester 450 Grams of o-tert.butylphenol (3 moles), 136 grams of 2,2-dimethyl-1,3-propanediol-bis-(acetoacetic acid ester) (0.5 mole) and 0.68 gram of ethyl mercaptan were saturated with hydrogen chloride as described in Example 1 and the mixture was condensed for 28 hours at 10°C. The reaction mixture was worked up as described in Example 1 and the crude product obtained was recrystallized from toluene.

Yield: 302 grams (62 % calculated on the acetoacetic acid ester). Melting point: 96°C. Analysis: $C_{53}H_{72}O_8$.

Calculated: 76.2 %, C; 8.6 %, H. Found: 77.0 %, C; 8.9 %, H.

EXAMPLE 5

Tetra[3,3-bis (4'-hydroxy-3'-tert.butylphenyl)-butanoic acid]-pentaerythritol ester 900 Grams of o-tert.butylphenol (6 moles), 236 grams of pentaerythritol-tetra(acetoactic acid ester) (0.5 mole) and 1.2 grams of ethyl mercaptan were saturated with gaseous hydrogen chloride while stirring and condensed for 24 hours at 10°C. After removal of hydrochloric acid, water and o-tert.butylphenol, 696 grams of a red resin were obtained (yield of crude product 87 %, calculated on the acetoacetic acid ester). The crude product was dissolved in toluene. After prolonged standing part of the pure product separated in the form of crystals. A further fraction of the pure product separated when hexane was added to the mother liquor.

Yield: 557 grams (69 % calculated on the acetoacetic acid ester). Melting point: 230°C. Analysis: $C_{101}H_{132}O_{16}$. Calculated: 75.9 %, C; 8.2 %, H. Found: 75.4 %, C; 8.3 %, H.

EXAMPLE 6

Tetra[3,3-bis(4'-hydroxy-3'-tert.butylphenyl)-butanoic acid]-1,1,4,4-tetramethylolcyclohexane ester 180 Grams of o-tert.butylphenol (1,2 moles), 54 grams of tetramethylolcyclohexane-tetra-1,1,4,4-(acetoacetic acid ester) (0.1 mole) and 0.3 gram of ethyl mercaptan were dissolved in 100 milliliters of methylene chloride. The solution was cooled in 10°C, saturated with gaseous hydrogen chloride and condensed for 24 hours at 10°C. After removal of the hydrochloric acid and the phenol in excess by distillation 146 g of crude product were obtained. The crude product was dissolved in benzene and boiled for 20 minutes with bleaching earth. After filtration and precipitation with hexane, 88 grams (53 %, calculated on the aceto-acetic acid ester) of a crystalline product having a melting point of 148°C were obtained. Analysis: $C_{106}H_{140}O_{16}$. Calculated: 76.2 %, C; 8.4 %, H. Found: 75.3 %, C; 8.3 %, H.

EXAMPLE 7

Bis[3,3-bis(2'-hydroxy-3'-methyl-5'-tert.butylphenyl)-butanoic acid]-1,4-butanediol ester In the manner described in Example 1, a mixture of 492 grams of 2-methyl-4-tert.butylphenol (3 moles), 129 grams of 1,4-butanediol-bis (acetoacetic acid ester) (0.5 mole) and 0.64 gram of ethyl mercaptan was condensed for 48 hours at 10°C in the presence of gaseous hydrogen chloride. After recrystallization from cyclohexane, 153 grams (35 %, calculated on the acetoacetic ester) of bis 3,3-bis (2'-hydroxy-3'-methyl-5'-tert.butylphenyl)-butanoic acid -1,4-butanediol ester were obtained.

Melting point: 161°C. Analysis: $C_{56}H_{78}O_8$. Calculated: 76.6 %, C; 8.8 %, H. Found: 75.8 %, C; 8.6 %, H.

EXAMPLE 8

Bis[3,3-bis (4'-hydroxy-3'-tert.butylphenyl)-butanoic acid]-1,4-dimethylolcyclohexane diol ester In a reaction flask 500 grams of o-tert.butylphenol (2.66 moles), 104 grams of 1,4-cyclohexane diol-bis (acetoacetic acid ester) (⅓ mole) and 0.38 gram of ethyl mercaptan were mixed and condensed for 48 hours at 10°C with gaseous hydrogen chloride. The reaction being terminated, the aqueous hydrochloric acid was removed at 10°–20°C by means of a water jet vacuum pump, the temperature was slowly raised to 180°C and the vacuum reduced to 1 mm of mercury. As distillation residue a yellow brown brittle resin was obtained. The residue was dissolved in toluene and the final product was precipitated as crystalline powder by adding hexane.

Yield: 230 grams (78 %, calculated on the acetoacetic acid ester. Melting point: 115°C. Analysis: $C_{56}H_{76}O_8$. Calculated: 76.6 %, C; 8.6 %, H. Found: 75.9 %, C; 8.7 %, H.

EXAMPLE 9

Bis[3,3-bis (4'-hydroxy-3'-tert.butylphenyl)-butanoic acid]-1,4-cyclohexane diol ester In the manner described in Example 8, 600 grams of o-tert.butylphenol (4 moles), 142 grams of 1,4-cyclohexane-diol-bis(acetoacetic acid ester) (0.5 mole) and 0.38 gram of ethyl mercaptan were condensed for 40 hours at 10°C in the presence of gaseous hydrogen chloride. After removal of the hydrochloride acid and the o-tert.butylphenol in excess by distillation, 420 grams of a crude product were obtained in the form of a brittle resin. The crystalline bis 3,3-bis-(4'-hydroxy-3'-tert.butylphenyl)-butanoic acid -1,4-cyclohexane-diol ester was obtained by dissolution in toluene and precipitation with hexane.

Yield: 220 grams (52 %, calculated on the acetoacetic acid ester). Melting point: 110°C. Analysis: $C_{54}H_{72}O_8$. Calculated: 76.5 %, C; 8.5 %, H. Found: 76.4 %, C; 8.5 %, H.

I claim:

1. In a process for the manufacture of a polyphenol-carboxylic acid ester from phenols of general formula I

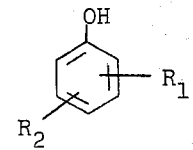

and polyacetoacetic acid esters of general formula II

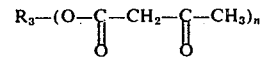

in which formulae $R_1$ and $R_2$ each stand for hydrogen atoms, identical or different alkyl radicals having 1 to 4 carbon atoms, $R_3$ represents a saturated, straight chain or branched aliphatic, cycloaliphatic hydrocarbon radical having from 2 to 12 carbon atoms or $R_3$ is p-phenylene, m-phenylene, or a naphthylene and $n$ is 2 to 4, the improvement of which comprises condensing the reaction components I and II at a temperature of from −10° to +15°C in the presence of gaseous hydrogen chloride and 0.05 to 0.5 % by weight of ethyl mercaptan, calculated on the polyacetoacetic acid ester.

* * * * *